March 14, 1967
F. G. J. GRISE ET AL
3,308,669
PROPORTIONATE LIQUID SAMPLING
DEVICE, SPECIFICALLY
A MILK SCALE
Filed Jan. 27, 1965
3 Sheets-Sheet 1
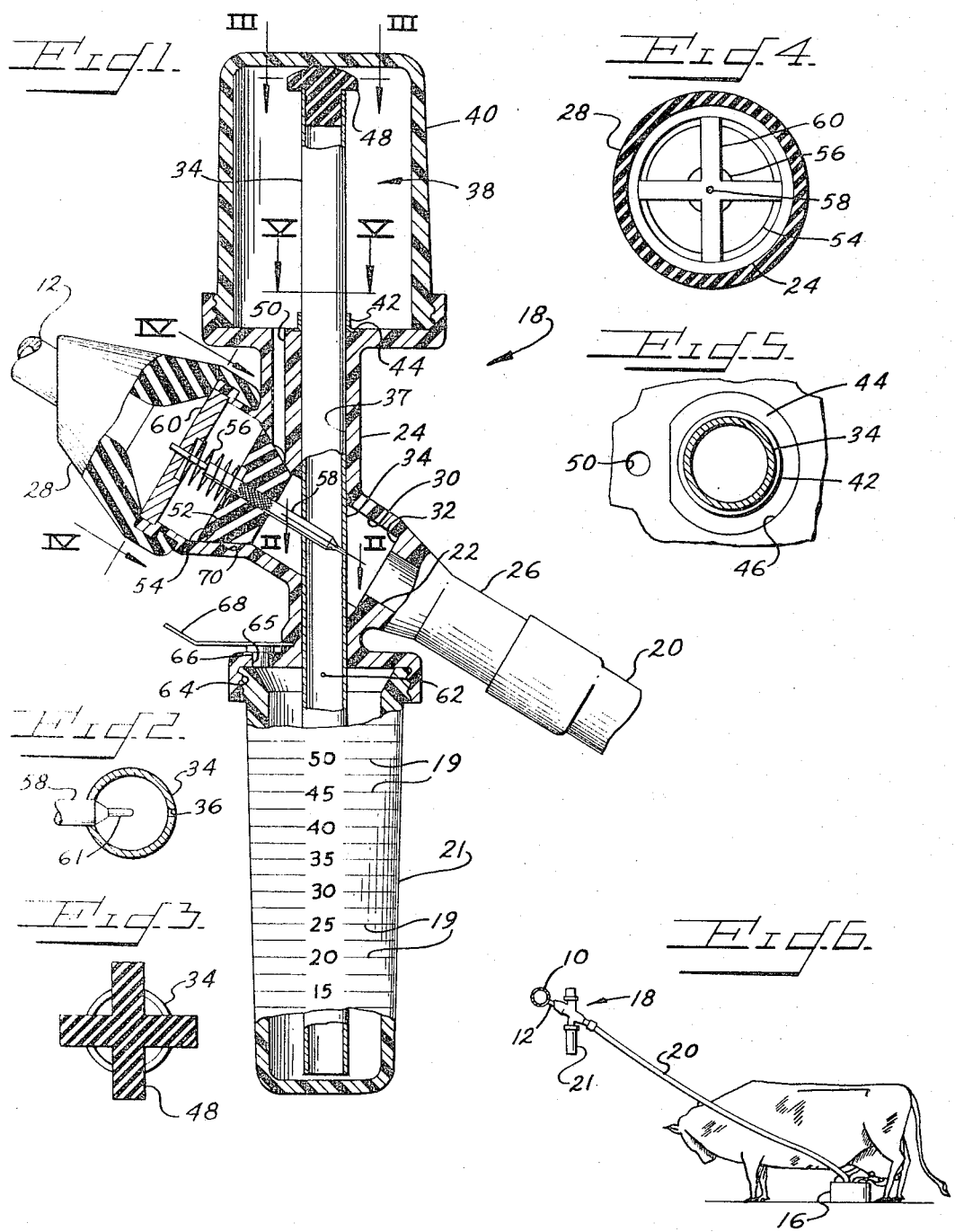
INVENTORS
FREDERICK G. J. GRISE
ROBERT F. RICE
BY Chapin + Neal
ATTORNEYS

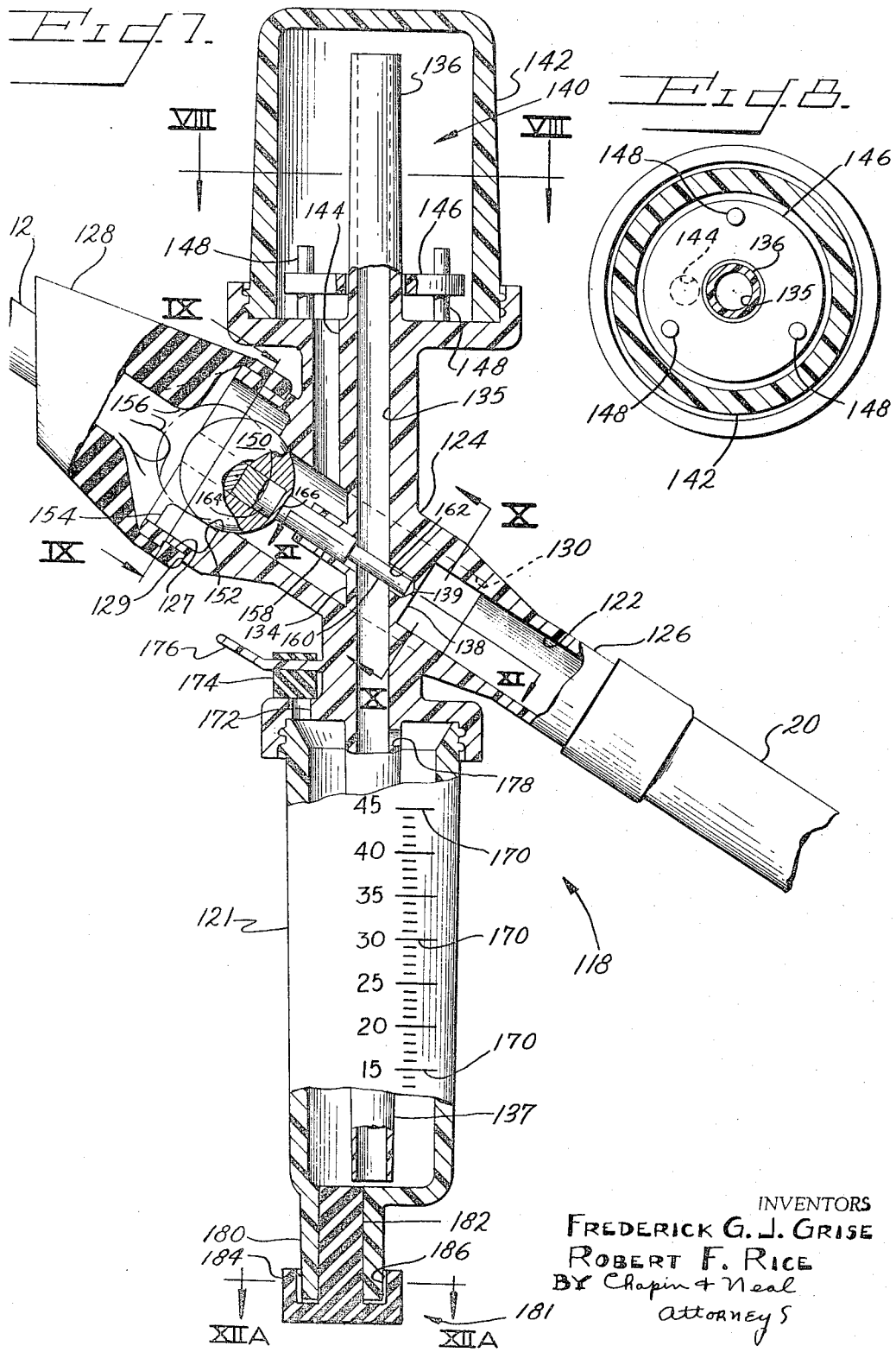

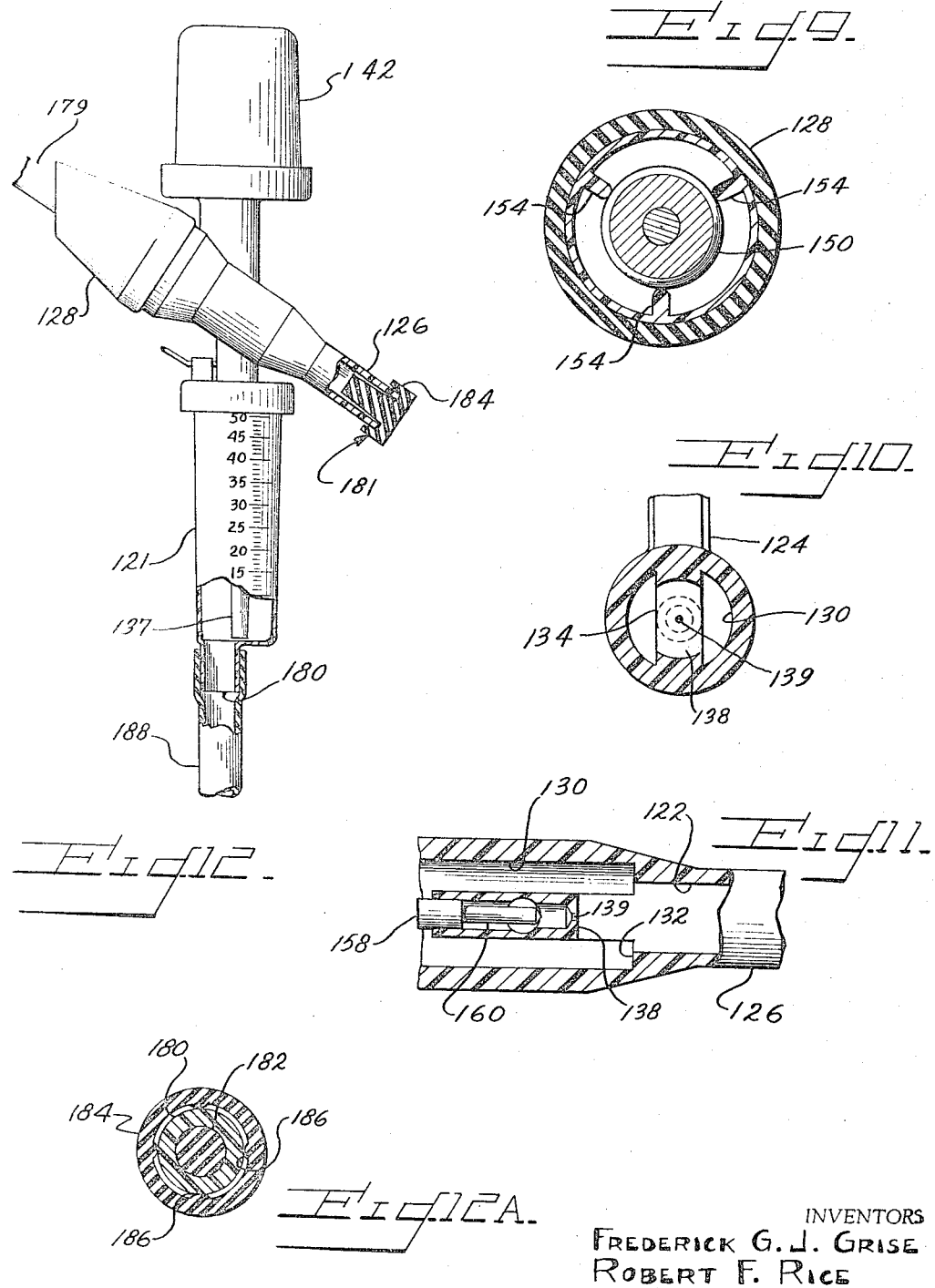

United States Patent Office 3,308,669
Patented Mar. 14, 1967

3,308,669
PROPORTIONATE LIQUID SAMPLING DEVICE,
SPECIFICALLY A MILK SCALE
Frederick G. J. Grise, Pleasant St., Barre, Mass. 01005,
and Robert F. Rice, 65 Eastern Ave., Leominster, Mass.
01453
Filed Jan. 27, 1965, Ser. No. 430,238
22 Claims. (Cl. 73—422)

This application is a continuation-in-part of copending application Ser. No. 288,987, filed June 19, 1963, now abandoned. The present invention relates to improvements in devices for measuring the amount of liquid flowing through a conduit and has particular applicability to the measurement of the amount of milk produced by individual cows, and as such is referred to as a milk scale.

The motivating environment for this invention is in the dairy industry, where milk is conveyed by a suction system directly from an automatic milking machine to a central processing and/or storage tank. This practice, to be most efficient, involves the immediate co-mingling of the milk of various cows in a herd and eliminates conventional volumetric measurements by which the production of individual cows is recorded. Without such records, a drop in the production of any given cow cannot be readily detected and the proper corrective measures taken before there has been any substantial production loss. Conventional displacement or rotary type meters for measuring production are ineffective or impractical because of the highly erratic nature of the milk flow which may be as high as 35 m.p.h. at one moment, and then in a reverse direction at another moment. These variations may result from the fact that several milking machines may be in operation at any given time, with varying requirements on the vacuum system which conveys the milk through the collection system to the storage tank. Mostly, however, such variations in milk flow are due to the inherent mode of operation of the milking machines as affected by the individual characteristics of the cows.

It has been proposed to measure milk production by installing a proportionate sampling device in the line connecting a milking machine with the collection system. However, the devices employed in this fashion have failed to recognize the specialized problems of measuring fluid flow under the conditions which exist in a milk collection system, and consequently are highly inaccurate and unreliable.

The primary object of the invention is to provide a highly accurate and yet economical device, known as a milk scale, for measuring the production of individual cows where a milk collection system of the type referred to is employed. In accomplishing this end, an accurate proportionate sample of milk is diverted from the output of a given milking machine, before the milk enters the main portion of the collection system where it could be co-mingled with milk of other cows.

Ancillary to this primary object, it is a further object of the invention to provide a milk scale which is readily cleansed in the same fashion as milking machines simply by passing wash water therethrough.

The usual practice is to employ one milking machine for approximately every ten cows in a herd. Economically, this means that a milk scale will be provided for each milking machine. In accordance with another object of the invention, improved means are provided for mounting the milk scale and connecting the milking machine to the collection system.

After each cow is milked, the sample of milk collected by the present milk scale indicates the amount of production of that cow. After recording or noting this amount, the sample may be poured into a separate container for butterfat tests. However, it is usually desired to return the sample to the collection system and a further object of the invention is to enable return of the sample to the collection system in a matter of a few seconds in a simple and uncomplicated manner.

While motivated by the needs and requirements of the dairy industry, it will be apparent that this invention, in its broader aspects, has for its object the provision of an economical device for accurately measuring the amount of liquid flowing through a conduit.

The above objects are attained by a device which may be described in the following fashion, recognizing that certain features thereof may be more broadly stated independently of one another.

The present device is employed in combination with a milk collection system which includes a downwardly angled suction conduit having displaceable means for sealing the end of said conduit when it is not in use. The device has a housing which includes a main or suction passageway that is aligned with this angled conduit. The device itself is connected to a milking machine by a hose which is attached to one end of this suction passageway. The other end of the suction passageway is defined by a resilient member which displaces the sealing means and is telescoped over the conduit of the collection system. The resilient member is expanded to grip the conduit and provide the sole means for mounting the milk scale when in use, thus eliminating the need and expense for separate mounting brackets at each stall which are required by conventional milk scales.

The milk scale further comprises a vertical tube preferably formed integrally with the main housing and disposed in the suction passageway and having a diameter or cross section less than that of the passageway so that milk may flow therepast. A vertically disposed collection cup for receiving the sample of milk is detachably secured to the housing with the lower end of the tube projecting therein and terminating at a point adjacent but spaced from the lower surface thereof. The tube has a relatively small orifice disposed on the axis of the suction passageway and facing upstream of the flow of milk therepast so that milk may flow into the collection cup. The collection cup has vertically spaced indicia, usually calibrated in pounds, so that the amount of the sample collected therein will reflect the production of an individual cow.

The device further includes means for providing a pressure balance on opposite sides of the orifice comprising an accumulator chamber disposed above the passageway into which the upper end of the tube projects, terminating at a point spaced above the lower extent of said chamber. A pressure balancing passageway extends from this upper chamber to the suction passageway to maintain the same pressure in the tube as in the suction passageway. The portion of the tube extending into the collection cup has a relatively small hole therethrough adjacent the upper end of the collection cup to prevent any buildup of pressure in the cup as a milk sample is collected therein.

A plunger projects through the opposite side of the tube to provide means for effectively sealing the orifice. A valve seat is formed in the suction passageway at a point downstream of the tube and the balancing passageway. A valve element, preferably having a spherical sealing surface, is engageable with the seat to seal said main passageways. The stem or plunger is connected to the valve element for movement therewith, whereby when the pressure on the downstream side of the valve is less than the pressure on the upstream side of the valve, the plunger will be unseated opening said main passageway and withdrawing the plunger from said orifice. Under these conditions the suction effective in the conduit is sufficient for the flow of milk therethrough. When the pressure balance is reversed, the valve element is seated preventing reverse flow of milk past the sampling orifice and at the same time causing the plunger to seal the orifice and prevent flow of milk into the collection cup when milk is not flowing through the suction passageway.

Once the milking operation is complete, the collection cup may be removed and the sample of milk taken may be employed for highly accurate butterfat tests or, where such tests are not required, means are provided for venting the upper end of the cup to atmosphere whereby the suction system will operate to automatically draw the milk upwardly through the tube, and into the accumulator, and then through the balancing passageway into the collection system. The arrangement is such that relatively large passageways may be employed for this return of the collected sample to the suction system in a matter of a very few seconds.

After each milking time it is considered essential to clean the milk scale. For this purpose, a plug may be removed from a port in the bottom of the collection cup and inserted into the inlet of the suction passageway. The tube from the milking machine is then connected to the collection cup port. Wash water is drawn through the milking machine and then through the milk scale to simultaneously clean both. A loose fit between the plug and suction passageway inlet increases turbulence of the wash water as air is drawn therein. This action, plus the integral construction of the main housing, enables the milk scale to be effectively cleaned in this simple and economical fashion.

The above and other related objects and features of the invention will be apparent from a reading of the following description of the disclosure found in the accompanying drawings and the novelty thereof pointed out in the appended claims.

In the drawings:

FIG. 1 is an elevation of the present milk scale with portions thereof in section;

FIG. 2 is a section, on an enlarged scale, taken generally on line II—II in FIG. 1;

FIG. 3 is a section, on an enlarged scale, taken on line III—III in FIG. 1;

FIG. 4 is a section, on an enlarged scale, taken on line IV—IV in FIG. 1;

FIG. 5 is a section, on an enlarged scale, taken on line V—V in FIG. 1;

FIG. 6 is a view of the milk scale as it would be employed in a milk collection system of the type referred to;

FIG. 7 is an elevation, partly in section, of an alternate embodiment of a milk scale form in accordance with the present invention;

FIG. 8 is a section taken on line VIII—VIII in FIG. 7;

FIG. 9 is a section taken on line IX—IX in FIG. 7;

FIG. 10 is a section taken on line X—X in FIG. 7;

FIG. 11 is a section taken on line XI—XI in FIG. 7; and

FIG. 12 is an elevation on a reduced scale illustrating how the milk scale may be cleaned; and FIG. 12a is a section taken on line XIIa—XIIa of FIG. 7.

Reference will first be made to the type of milking system in which the present milk scale finds particular utility. A pipe or conduit, as indicated by reference character 10 in FIG. 6, runs the length of each row of stalls in a dairy barn and is generally disposed at a height of five to six feet. A downwardly angled conduit or tube 12 projects from the pipe 10 between each pair of stalls to provide a means for connecting a milking machine to the collection system. A closure, not shown, normally seals the end of each conduit 12 when not in use. As indicated, each milking machine is used to milk approximately 10 cows, being connected to the appropriate conduits 12 along the line of stalls. This means that, with the average herd, there will be several machines in use. Milk is drawn from the milking machines to the pipe or pipes 10 and then to a collection and/or processing tank (not shown) at a remote source, by suction from a common vacuum source.

With the above discussion in mind, FIG. 6 shows a milking machine 16 connected to a cow for milking. The machine 16 is connected to the milk scale of the present invention, indicated at 18, by a hose 20. The milk scale is in turn connected to the adjacent conduit 12. Milk flows from the machine 16, through the hose 20, through the milk scale 18, and then to pipe 10, and the remote collection tank. As the milk passes through the scale 18, a small but accurate proportionate sample is drawn into a collection cup 21. The collection cup is preferably transparent and provided with indicia 19 (see FIG. 1) calibrated so that the volume of the sample indicates the amount of milk flow in pounds, this being the usual unit for measuring milk production.

It will be noted that the milk scale is conveniently disposed at eye level so that the amount of milk produced by each cow may be readily observed and recorded where desired. After each milking, the sample in the collection cup may be emptied into the pipe 10 by means later described. The milk scale is then removed from the conduit 12 and the machine 16 will be taken to the next stall where the milking process will be repeated with the milk scale attached to another of the conduits 12.

Referring to FIG. 1, the construction of the milk scale itself will now be described. The milk flowing through the scale passes along a passageway 22, referred to as the main or suction passageway, formed in a housing 24. The housing 24 has a tubular extension 26 over which the hose 20 is telescoped and may be simply secured thereto by the resilient property of the hose material. The opposite end of the passageway 22 is defined by a resilient member 28 which is telescoped over the conduit 12. Connecting the milk scale and accompanying milking machine to the milk collection system is thus extremely simple. The member 28 is simply telescoped over the conduit 12 and expanded sufficiently that its resilient property will hold it in place. At the same time the collection cup is disposed in a vertical position at eye level to facilitate an accurate reading of the amount of the sample taken during each milking.

Milk entering the passageway 22 flows into an enlarged portion thereof, indicated at 30, over a relatively sharp edge 32. This arrangement is believed to cause a turbulent flow condition and a substantially constant velocity gradient for the milk flowing through the passageway 30 as it passes around a vertically disposed tube 34 therein. The sample of milk is drawn through an orifice 36 (FIG. 2) in the upstream wall of the tube 34 and flows into the collection cup 21 under conditions later described in detail.

The tube 34 is received by a hole 37 in the housing 24 which extends on opposite sides of the suction passageway portion 30. The lower end of the tube 34 projects into the cup 21 and preferably terminates at a point spaced from but closely adjacent the bottom surface thereof. The upper end of the tube 34 projects into a chamber 38 which is conveniently formed by a cup 40 threadably secured to the upper portion of the housing 24. Preferably the upper end of the tube 34 terminates at a point substantially above the lower extent of the chamber 38. The tube may be accurately positioned in a heightwise and angular sense by a collar 42 (FIG. 5) secured thereto (by silver solder or the like) and having a non-circular flange 44 (or other angular positioning means) received by a recess 46 of corresponding outline in the portion of the housing 24 defining the lower surface of the chamber 38. A headed rubber plug 48 is inserted in the upper end of the tube 34. This plug is compressed as the cup 40 is threaded onto the housing 24 to insure bottoming of the flange 44 in the recess 46. It is also preferable that there be no leakage from the suction passageway along the outside of the tube 34 into either the cup 21 or chamber 38. This end may be readily attained by providing a tight fit between the tube 34 and the bore 37.

It is preferable that there be constant pressure differential on opposite sides of the orifice 36 through which the sample of milk flows. Most conveniently this differential is zero as a pressure balance is maintained at all times when there is a flow of milk through this orifice. This end is obtained by providing a connection between the suction passage 22 and the interior of the tube 34. Thus the plug 48 (FIG. 3) is grooved to provide communication between the suction passageway 22 and chamber 38.

The passageway 50 enters the suction passageway 22 intermediate the length of a valve seat 52 formed therein. A valve plug or element 54 is urged into engagement with seat 52 by a spring 56 to seal both of the passageways 22 and 50. A stem 58 projects from opposite sides of the plug 54 with its left hand end slidably received and guided by a spider 60 (FIG. 4) which also restrains one end of the spring 56. The right hand end of the stem or plunger 58 is slidingly received and guided by a hole in the downstream wall of the tube 34. This end of the stem 58 terminates in tip 61 (shown in a withdrawn position in FIG. 2) having a diameter which closely approximates that of the orifice 36. The portion of the stem 58 passing through the downstream wall of the tube 34 is also sealingly received by the hole therefor so that milk may enter the tube 34 only through the orifice 36 and then only when the valve plug 54 is unseated.

When the milk scale is initially connected to the conduit 12, the suction force of the collection system will unseat the valve plug 54 allowing air to be evacuated from the hose 20 and machine 16 as operation of the machine is initiated. Milk will then pass through the passageway 22 as it is drawn to the pipe 10 of the collection system. As this occurs a small, accurate, proportionate sample of the milk will pass through the orifice 36 (tip 61 having been withdrawn to the position of FIG. 2) and enter the collection cup 21. In order that the milk sample may freely enter the cup 21, a small hole 62 is provided through the tube 34 adjacent the upper end of the cup. This prevents air from being trapped in the cup and any buildup of pressure which would affect the ability of the milk to reach a level relative to the indicia 19 representing the true volume of the sample.

As was indicated above, the vacuum pressure in the conduit 12 may vary greatly as can the rate of movement of the milk. Regardless of these variations, a pressure balance will be maintained between the interior of the tube 34 and the suction passageway 22, this being one factor contributing to the accuracy of the sample obtained. In this connection, it will be noted that the chamber 38 functions as an accumulator. Thus, when there is a drop in the suction force in passageway 22, milk will actually be drawn into the chamber 38 to maintain the described pressure balance. The size of the chamber 38 may be selected so that under no working conditions will milk flow over the top of the tube 34 and affect the accuracy of the sample in the cup 21.

As has also been indicated, operation of the milking machine is such that milk will actually tend to flow in a reverse direction. The valve plug 54 functions as a check valve to prevent such reverse flow. Thus, when the suction force drops to a point where milk is no longer being drawn through the conduit 12, the plug 54 will seat, preventing reverse flow of milk in the suction passageway 22. This means that the milk flows past the tube 34 only once, and a sample cannot be taken again as would be the case if the milk could repeatedly surge against the orifice 36.

When the plug seats as a result of a drop in the suction force, the pressure balancing passageway 50 is also sealed. This maintains the pressure balance on opposite sides of the orifice 36. It also prevents air from entering the passageway 22 so that the milk will stay in this passageway until the suction force is again sufficient to draw the milk into the collection system.

Also, when the plug 54 seats, the stem tip 61 enters the orifice 36. This serves two functions; first it provides a positive seal which prevents milk from entering the orifice and causing an inaccuracy in the volume of the sample. Also, the tip 61 provides means for periodically cleaning the orifice. This prevents a buildup of milk solids or other matter which would otherwise reduce the effective diameter of the orifice. This, too, is a feature contributing to the high degree of accuracy and reliability of the present milk scale.

When milking of the cow is finished, the sample in the cup 21 may either be returned to the collection system or it may be employed for butterfat or other tests. For the latter purposes, the cup 21 is removably secured to the housing 24 by a threaded connection indicated at 64.

To return the sample to the collection system, the upper end of the cup 21 is simply vented to atmosphere. A venting hole 65 is provided in the housing 24 immediately above the cup 21. In normal operation this hole is sealed by disc 66 attached to a leaf spring 68. The free end of this spring is raised to open the hole 65 and permit atmospheric pressure to be effective on the surface of the milk in the cup. This pressure causes the milk to flow up the tube 34, into the chamber 38, and then down passageway 50. Atmospheric pressure is also effective to unseat the valve plug 54 so that the sample will then be drawn directly to the collection system. In this conneciton it will be noted that a groove 70 is preferably formed in the valve seat 52 so that a greater force is provided to unseat the plug 54. Also the spring 56 is extremely light; a force of only a few ounces is required to insure its functioning as described above and this force is readily overcome in returning the sample to the collection system. It will also be noted that hole 62 in the tube 34 is extremely small so that atmospheric pressure will be effective primarily on the milk in cup 21 outside of this tube to return the sample, as described. With the tube 34 terminating adjacent the bottom of the cup 21, it will be apparent that substantially all the sample will be emptied therefrom so that the milk scale will be ready for a subsequent operation without further cleaning. It will be apparent that the tube 34 could actually engage the bottom surface of cup 21 and have notches in its lower end which would provide for discharge of the sample in the same fashion.

It will also be apparent that as the milk is returned to the collection system, it does not pass through any greatly constricted passageways. This means that return of the sample requires only a very few seconds.

The alternate embodiment of the invention seen in FIGS. 7–12a (primarily reference will be made to FIG. 7), and identified generally by reference character 118, may be substituted in a milking system as described in connection with FIG. 6 and functions in the same overall fashion to collect a representative proportionate sample of milk in a cup 121. This milk sample may likewise be analyzed to determine butterfat content, etc. and/or its volume recorded to provide a production record for individual cows.

The construction of the alternate embodiment 118 differs from the first described embodiment in several respects which improve the accuracy of the sample and facilitate washing of the milk scale after use. The basic functional components, however, are found in both embodiments. Thus, milk flows to the scale 118 through hose 20 and passes along a passageway 122, referred to again as the main or suction passageway, formed in a housing 124. The housing 124 has a tubular extension 126 over which the milk machine hose 20 is telescoped and may simply be secured thereto by the resilient property of the hose material. The opposite end of the passageway 122 is defined by a resilient member 128 which is telescoped over the pipe collection system conduit 12 and expanded sufficiently that its resilient property will hold it in place. The member 128 is telescoped over a tubular portion of the housing 124 and is held thereon by an annular lip 127 which is received by a groove 129.

Milk entering the main passageway 122 flows into an enlarged portion thereof indicated at 130, over a relatively sharp edge 132 (FIG. 11). This arrangement is believed to cause a turbulent flow condition and a substantially constant velocity gradient for the milk flowing through the passageway portion 130 as it passes around a vertically disposed tube 134 intersecting the main passageway. In the present embodiment of the invention, the tube 134 is formed as an integrally molded component of the housing 124, and tends to lose its identity as compared with the tube 34 of the first described embodiment. For this reason reference will be made to a vertical passageway 135 which extends from the top of a tubular extension 136, through the tubular portion 134, to the bottom of a tubular extension 137. Both of these extensions are integrally molded components of the housing 124 and the portion of the housing 124 defining vertical passageway 135 are to be considered as a functional equivalent of the tube 34, but advantages later described. The upstream side of the tube 134 is preferably formed with a flat face 138 (FIGS. 7 and 11) disposed normal to the path of milk flowing therepast. The sample of milk is drawn through an orifice 139 (see also FIG. 10) in the flat upstream face 138 of the tube 134. The sample of milk flows downwardly through the tube passageway 135 into a collection cup 121 attached to the housing 124.

As described in connection with the previous embodiment, it is preferable that there be a constant pressure differential on opposite sides of the orifice 139 through which the sample of milk is drawn. Again, and most conveniently, this differential is zero, as a pressure balance is maintained therebetween at all times.

Thus the inner end of the orifice 139 is placed in communication with the suction passageway 122 by way of passageway 135 which opens from the tubular extension 136 into a chamber 140 which is formed by an inverted cup 142 threadably secured to the main housing 124. A vertical hole 144 completes this pressure balancing passageway means connecting the lower end of the chamber 140 to the main passageway 122. The tubular extension 136 terminates at the upper end of the chamber 140 permitting milk to be drawn into that chamber to effect the required pressure balance without permitting such milk to flow to the collection cup 121 and affect the accuracy of the sample being taken.

As has been indicated, milk frequently surges very rapidly through the passageway 122. Such surging can result in milk entering the chamber 140 through passageway 144 with such force that it actually might splash over the top of the tubular extension 136 and fall into the collection cup 121. To prevent this possible source of inaccuracy, a circular baffle plate 146 (see also FIG. 8) is telescoped over the tubular extension 136. The baffle plate 146 is positioned by integral legs 148 in spaced relation from the upper end of the passageway 144 to permit free flow of milk into the chamber 140. The baffle 146 is also of a lesser diameter than the cup 140 so that no pressure is built up thereon to affect the pressure balance which is desired. It will be seen that similar legs 148 are provided on the upper surface of the baffle plate 146 so that either side may be its up side to facilitate assembly.

In distinction to the first described embodiment, it will be noted that the entrance of the passageway 144 into the main passageway 122 is unobstructed so that there is communication for balancing purposes at all times between the inner end of orifice 139 and the enlarged passageway portion 130. This arrangement has been found preferable in providing a more effective pressure balance particularly where air is first evacuated from the suction system when initially starting a milking operation to prevent a pressure unbalance that could affect the accuracy of the sample.

A check valve comprising a valve element in the form of a metal ball 150 is engageable with a tapered seat 152 in passageway 122 to prevent reverse flow of milk past the orifice 139 so that surging of milk cannot take place at this point and give a false reading by drawing more than one sample from the same body or volume of milk. The passageway 122 is sufficiently inclined to the vertical so that the weight of the ball 150 is sufficient to cause it to effectively seal against the seat 152. The line contact therebetween facilitates such sealing action. Vanes 154 formed in the passageway 122 (see also FIG. 9) guide the ball 150 when it is unseated and permit flow of milk therearound and then through the resilient member 128. Vanes 156 formed integrally with the member 128 limit movement of the ball 150 when it is unseated (see phantom position) and further provide for continued flow of milk through the passageway 122 to the suction conduit 12.

Means are also provided for sealing the orifice 139 when there is no flow of milk past the check valve 150. These means comprise a plunger 158 which is slidably received in a boss projecting from the downstream side tube 134. The fit therebetween is such that milk cannot pass through or along this slidable journal. The reduced forward end of the plunger 158 provides a stem 160 having a diameter less than the passageway 135 and enters a recess 162 therefrom leading to the orifice 139 (see also FIG. 11). The forward terminal end of the stem 160 serves as a valve and sealingly engages the base of the recess 162 to prevent flow of milk through the orifice 139.

The plunger 158 and the valve ball 150 are joined together for simultaneous movement. Preferably the means for so joining the two members comprises a magnet 164 which is received in a blind hole formed in the ball 150. The ball 150 has a flat 166 closely spaced from the magnet 164 with the outer end of the plunger 158 being held thereagainst by the magnet 164. Thus when milk flows through the passageway 122 unseating the ball 150, the plunger 158 will be drawn therewith to the position shown in FIG. 11 permitting flow of milk through the orifice 139. The described arrangement is highly desirable in that machining tolerances are greatly reduced in obtaining the desired simultaneous sealing action by the ball 150 and the end of stem 160. While axial dimensions must still be fairly closely maintained, radial or concentricity tolerances can be greatly increased as the plunger 158 may shift in this sense relative to the ball 150. Also, the magnetic connection orients the ball, preventing it from rotating so that the same portion thereof will engage the seat 152 and only this portion need be accurately formed. In fact, except for this small portion, the remainder of the member 150 considered as a valve element need not necessarily be spherical. Functionally the magnetic connection is highly effective in preventing sticking of the valve, should foreign matter be trapped between the ball and the seat. The ball 150 may cock relative to the plunger 158 without exerting any substantial binding force thereon. Usually the foreign matter will automatically be removed the next time the valve is opened and the device will automatically return to normal operation.

It would further be pointed out that stainless steel is the preferred metal to be employed in milk handling equipment and that the ball 150 and plunger 158 are therefore formed of such material or equivalent in most uses of the invention. To prevent contact of the milk with the magnet 164, the magnet is inserted in the blind hole as described and separated from the plunger 158 by a thin layer of the ball material to obtain effective magnetic action. The opposite end of this hole is filled by stainless steel welding which usually requires that the magnet 164 be magnetized after the welding operation.

It will also be noted that as the ball 150 opens and closes it causes the plunger stem 160 to create a pumping action which tends to prevent solids from building up in the orifice 139 and provides a cleaning action similar to that of the tip 61 of the previous embodiment.

From the above and from the description of the previous embodiment, it will be apparent that as milk flows upwardly through the passageway 122, a representative sample passes through the orifice 139 and flows into the cup 121 to provide a highly accurate sample of the milk reflecting the volume of milk which is produced by a given cow at a given milking. The collection cup may again be calibrated by indicia 170 representing the volume of milk in pounds, this being the normal standard of measure.

The collection cup 121 is secured to the main housing 124 by a threaded connection which permits the collection cup to be removed so that the sample therein may be analyzed to determine butterfat content, etc., if desired. However, in the normal course, it is more usual to return the milk sample to the collection system. This end is attained in essentially the same manner as in the previous embodiment, that is, means are provided for venting the upper end of the collection cup 121 to atmosphere whereby the suction in the collection system is effective through the passageways 144, chamber 140, and passageway 135 to draw the milk sample from the collection cup 121 and carry it to the suction passageway 122. These venting means take the form of a vent opening 172 formed in the housing flange to which the cup 121 is attached. Normally this vent opening is closed by a rubber pressure pad 174. Pressure pad 174 is apertured and telescoped over an integral finger 176 projecting from the housing 124. The material from which the housing is formed has sufficient resiliency to normally maintain the pressure pad 174 in its sealing position and yet is flexible enough to be bent so as to lift the pad 174 and expose the vent opening 172 to atmosphere. It will further be noticed that an opening 178 is provided in the tubular extension 137 adjacent the top of the collection cup 121. The purpose of this opening is to prevent a pressure build-up as a milk sample is deposited in the collection cup. It has been found that the vent opening need not be a pinhole as previously described, though preferably it should be placed on the side of the tubular extension 137 remote from the vent opening 172.

The present embodiment of the invention has a further feature in that it may be readily and economically washed after each milking by the simple expedient of placing it on a conventional wash rack normally employed to clean milking machines. This wash rack comprises a vacuum conduit 179 (FIG. 12) over which the resilient member 128 is telescoped. It will be noted at this point that a tubular extension 180 is provided at the bottom of the collection cup 121 and is normally sealed (FIG. 7) by a closure 181 having a plug portion 182 tightly inserted into the extension 180 and preferably extending to the bottom of the cup 121.

When the milk scale is to be washed, the closure 181 is removed and inserted into the tubular extension 126 of the housing 124 as illustrated in FIG. 12. It will further be noted that the closure 182 is provided with a skirt 184 which is expanded over the tubular extension 126 to hold it thereon. The plug portion 182 thereof fits freely within and is spaced from walls of passageway 122. Further, ribs 186 (FIG. 12a) are provided on the skirt 184 and extending around the outer end surface of the tubular extension 126 to provide means for venting air into the section passageway at this point as a liquid seal is provided by the skirt 184.

A hose 188 is telescoped over the tubular extension 180 of cup 121 and extends to an appropriate source of wash water. Suction through the conduit 179 draws wash water upwardly into the collection cup 121 and at this point it will be noted that the tubular extension 180 is offset from the tubular extension 137 so that a whirlpool action of the wash water effectively cleanses the cup 121. This cleaning action is also enhanced by the fact that air is preferably entrained in the wash water. The wash water is drawn upwardly into the chamber 140 and then back to the main passageway 122 through hole 144. The angle relation of hole 144 directs wash water toward the closed end of passageway 122 to provide for cleaning of that area. The air vented by closure 181 gives a scrubbing action and a circulation of wash water which is finally drawn into the suction conduit 179. It will also be seen that wash water passes through the orifice 139 so that all internal surfaces are cleaned.

It will be appreciated that the integral construction of the housing 124 to provide all necessary passageways, minimizes if not eliminates, possible crevices or the like where milk solids or bacteria might collect. The net result is that there is a maximum of convenience in the use of the present milk scale, not only in its installation in a collection system and its provision of a readily available sample, but also in its cleaning as well.

Having thus described the invention, what is claimed as novel and desired to be secured by Letters Patent of the United States is:

1. A milk scale or other device for obtaining a proportionate sample from a small liquid stream, comprising a main passageway for the liquid stream, a cup, means for diverting a small proportionate sample of liquid from said main passageway to said cup, said diverting means comprising a small orifice through which the sample passes, a plunger operatively associated with said orifice on the inner side thereof and means for periodically moving said plunger toward and away from said orifice and creating a pumping action for removing solids which tend to collect in said orifice and affect its size and the accuracy of the sample passing therethrough.

2. A milk scale or other device for obtaining a proportionate sample from a flowing liquid stream comprising a main passageway for the liquid stream, a cup, means for diverting a small proportionate sample of liquid from said main passageway to said cup, said diverting means comprising an orifice through which the sample passes and means for sealing said orifice when the flow of liquid therepast in a given direction is interrupted and opening said orifice when liquid flows in said given direction.

3. A milk scale or other device for obtaining a proportionate sample from a flowing liquid stream comprising a main passageway for the liquid stream, a cup, means for diverting a small proportionate sample of liquid from said main passageway to said cup, said diverting means comprising a small orifice through which the sample passes, means for sealing said orifice when the flow of liquid therepast in a given direction is interrupted and opening said orifice when liquid flows in said given direction, and a check valve disposed adjacent to and downstream of said orifice and arranged to prevent reverse flow of the liquid stream therepast.

4. A milk scale or other device for obtaining a proportionate sample from a flowing liquid stream, comprising a main passageway for the liquid stream, a cup, means for diverting a small proportionate sample of liquid from said main passageway to said cup, said diverting means comprising a small orifice through which the sample passes, a check valve disposed adjacent to and downstream of said orifice and arranged to prevent reverse flow of the liquid stream therepast and means for sealing said orifice, said sealing means being connected to said check valve and movable therewith to seal said orifice when said check valve is closed, and open said orifice when said check valve is open.

5. A milk scale or other device for obtaining a proportionate sample from a flowing liquid stream, comprising a main passageway for the liquid stream, a cup, means for diverting a small proportionate sample of liquid from said main passageway to said cup, said diverting means comprising a small orifice through which the sample passes, a check valve disposed adjacent to and downstream of said orifice and arranged to prevent reverse flow of the liquid stream therepast, said check valve including a seat aligned with said orifice, a plunger engageable with said orifice to prevent flow of liquid therethrough, magnetic means connecting said plunger and said check valve with both being in sealing engagement simultaneously with the valve seat and orifice, and the orifice opened when the check valve is opened.

6. A milk scale or other device for obtaining a proportionate sample from a flowing liquid stream, comprising a main passageway for the liquid stream, a cup, means for diverting a small proportionate sample of liquid from said main passageway to said cup, said diverting means including a tube projecting into said main passageway and having a small orifice in the upstream wall thereof through which the sample passes to the interior of said tube and then to said cup, a check valve disposed adjacent to and downstream of said tube, and arranged to prevent reverse flow of the liquid stream therepast, said check valve including a conical seat aligned with said orifice and a valve element having a spherical surface engageable with said seat, a plunger for sealing the inner end of said orifice to prevent flow of liquid therethrough, said plunger being slidably journaled in the downstream wall of said tube and engageable with the inner side of said orifice, said valve element engaging said seat and said plunger when said plunger sealingly engages the inner side of said orifice, and magnetic means connecting said plunger and said check valve whereby when the check valve member is unseated by the flow of fluid through said main passageway, the plunger is simultaneously displaced from said orifice to permit the flow of a sample therethrough.

7. A milk scale as in claim 6 wherein the main passageway is upwardly inclined and further wherein the check valve element is in the form of a ball having a flat thereon and the plunger has a matching flat on its end opposite the orifice which engages the flat of the ball, and further wherein both the ball and the flat are formed of stainless steel and a permanent magnet is imbedded in said ball behind said flat.

8. A milk scale or other device for obtaining a proportionate sample from a flowing liquid stream and comprising a housing having a main passageway for flow of the liquid stream therethrough, a tube intersecting said main passageway so that the liquid stream may flow therearound, and a collection cup disposed below said main passageway, the lower portion of said tube providing a passageway leading to said collection cup, said tube having an orifice in its upstream wall for the passage of a sample of liquid from the main passageway to the collection cup so that a sample will be collected therein as liquid flows through the main passageway and means for maintaining a constant pressure differential on opposite sides of said orifice and including an accumulator chamber, the upper portion of said tube extending to a point spaced substantially above the lower end of said accumulator chamber and providing a passageway thereto, and a passageway connecting the lower end of said accumulator chamber and said main passageway so that liquid may surge into said accumulator chamber in maintaining the desired pressure balance and further comprising a baffle telescoped over the portion of the tube extending into said accumulator chamber and overlying the passageway from said main passageway to prevent liquid from splashing into said tube.

9. A milk scale or other device for obtaining a proportionate sample from a flowing liquid stream and comprising a housing having a main passageway for flow of the liquid stream therethrough, a tube integrally molded with said housing and intersecting said main passageway so that the liquid stream may flow therearound, a collection cup disposed below said main passageway, the lower portion of said integrally formed tube providing a passageway leading to said collection cup, said tube having an orifice in its upstream wall for the passage of a sample of liquid from the main passageway to the collection cup so that a sample will be collected therein as liquid flows through the main passageway and means for maintaining a constant pressure differential on opposite sides of said orifice and including an accumulator chamber, the upper portion of said integrally formed tube projecting into said accumulator chamber to a point spaced substantially above the lower end thereof and providing a passageway thereto and a passageway connecting the lower end of said accumulator chamber and said main passageway so that liquid may surge into said accumulator chamber in maintaining the desired pressure balance.

10. A milk scale or other device for obtaining a proportionate sample from a flowing liquid stream and comprising a housing having a main passageway for flow of the liquid stream therethrough, a tube intersecting said main passageway so that the liquid stream may flow therearound and a collection cup disposed below said main passageway, the lower portion of said tube providing a passageway leading to said collection cup, said tube having an orifice in its upstream wall for the passage of a sample of liquid from the main passageway to the collection cup so that a sample will be collected therein as liquid flows through the main passageway, means for maintaining a constant pressure differential on opposite sides of said orifice and including a passageway extending through the upper portion of said tube back to said main passageway, a check valve disposed adjacent to and downstream of said tube, and arranged to prevent reverse flow of the liquid stream therepast, and a plunger connected to said check valve for movement therewith, said plunger extending through the downstream wall of said tube and sealingly engaging said orifice when said check valve is closed whereby when said check valve is open said plunger is displaced to permit flow of liquid through said orifice.

11. A milk scale or other device for obtaining a proportionate sample from a flowing liquid stream and comprising a housing having a main passageway for flow of the liquid stream therethrough, a tube integrally molded with said housing and intersecting said main passageway so that the liquid stream may flow therearound and a collection cup disposed below said main passageway, the lower portion of said integrally formed tube providing a passageway leading to said collection cup, said tube having an orifice in its upstream wall for the passage of a sample of liquid from the main passageway to the collection cup, a check valve disposed adjacent to and downstream of said tube and arranged to prevent reverse flow of the liquid stream therepast, said check valve comprising a conical seat formed in said main passageway and a valve element engageable therewith, said conical seat being aligned with said orifice, a plunger connected to said valve element for movement therewith, said plunger extending through the downstream wall of said tube and sealingly engaging said orifice when said check valve is closed whereby when said check valve is open said plunger is displaced to permit flow of liquid through said orifice and means for maintaining a constant pressure differential on opposite sides of said orifice and including an accumulator chamber, the upper portion of said integrally formed tube projecting into said accumulator chamber to a point spaced substantially above the lower end thereof and providing a passageway thereto and a passageway connecting the lower end of said accumulator chamber and said main passageway so that liquid may surge into said accumulator chamber in maintaining the desired pressure balance.

12. A milk scale or other device for obtaining a proportionate sample from a flowing liquid stream and comprising a housing having a main passageway for flow of the liquid stream therethrough, a tube intersecting said main passageway so that the liquid stream may flow therearound and a collection cup disposed below said main passageway, the lower portion of said tube providing a passageway leading to said collection cup and terminating at a point spaced closely adjacent the bottom of said cup, said tube having an orifice in its upstream wall for the passage of a sample of liquid from the main passageway to the collection cup so that a sample will be collected therein as liquid flows through the main passageway, means for maintaining a constant pressure differential on opposite sides of said orifice and including a passageway extending through the upper portion of said tube back to said main passageway, a check valve disposed adjacent to and downstream of said tube and arranged to prevent reverse flow of the liquid stream therepast and a plunger connected to said check valve for movement therewith, said plunger extending through the downstream wall of said tube and sealingly engaging said orifice when said check valve is closed whereby when said check valve is open said plunger is displaced to permit flow of liquid through said orifice, and means for venting the upper end of said collection cup to atmosphere whereby suction applied through said main passageway will draw the sample from said collection cup upwardly through said tube and through said pressure balancing means back to said main passageway.

13. A milk scale for obtaining a proportionate sample of milk from a flowing milk stream and comprising a housing having a main passageway for flow of the milk stream therethrough, a tubular portion of said housing defining the upstream end of said main passageway and adapted to have a hose leading to a milking machine telescoped thereover, the upstream or discharge end of said main passageway being defined by a resilient member secured to said housing and adapted to be telescoped over a suction conduit forming part of a milk collection system, said main passageway being angled upwardly from its upstream end to its discharge end, a tube intersecting said main passageway so that the milk stream may flow therearound, a vertically disposed collection cup detachably secured to said housing beneath said main passageway, the lower portion of said tube providing a passageway leading to said cup and terminating at a point spaced from and closely adjacent the bottom thereof, said tube having an orifice in its upstream wall for the passage of a sample of liquid from the main passageway to the collection cup so that a sample will be collected therein as liquid flows through the main passageway, said tube having an opening therein adjacent the upper end of said cup to prevent a buildup of pressure in said cup as the sample is collected therein, said cup having vertically spaced indicia reflecting the amount of milk passing through the main passageway as represented by the sample collected in said cup, means for maintaining a constant pressure differential on opposite sides of said orifice and including an accumulator chamber, the upper portion of said tube projecting into said accumulator chamber to a point spaced substantially above the lower end thereof providing a passageway thereto and a passageway connecting the lower end of said accumulator chamber and said main passageway so that liquid may surge into said accumulator chamber in maintaining the desired pressure balance, a check valve disposed adjacent to and downstream of said tube and arranged to prevent reverse flow of the milk stream therepast, and a plunger connected to said check valve for movement therewith, said plunger extending through the downstream wall of said tube and sealingly engaging said orifice when said check valve is closed whereby when said check valve is open said plunger is displaced to permit flow of milk through said orifice and means for venting the upper end of said collection cup to atmosphere whereby suction applied to said main passageway will draw the sample upwardly through said tube and through said pressure balancing means, back to said main passageway.

14. A milk scale for obtaining a proportionate sample of milk from a flowing milk stream and comprising a housing having a main passageway for flow of the milk stream therethrough, a tubular portion of said housing defining the upstream end of said main passageway and adapted to have a hose leading to a milking machine telescoped thereover, the upstream or discharge end of said main passageway being defined by a resilient member secured to said housing and adapted to be telescoped over a suction conduit forming part of a milk collection system, said main passageway being angled upwardly from its upstream end to its discharge end, a tube integrally molded with said main housing and intersecting said main passageway so that the milk stream may flow therearound, the wall of said tube facing the downstream end of said main passageway being disposed in a plane normal to the direction of milk flow, said tube further having a vertically disposed passageway therethrough, a vertically disposed collection cup detachably secured to said housing beneath said main passageway, said integrally formed tube extending downwardly into said collection cup and terminating at a point spaced from and closely adjacent the bottom thereof, the portion of said tube intersecting said main passageway having an orifice in its upstream wall for the passage of a sample of liquid from the main passageway to the collection cup so that a sample will be collected therein as liquid flows through the main passageway, said tube having an opening therein adjacent the upper end of said cup to prevent a buildup of pressure in said cup as the sample is collected therein, said cup having vertically spaced indicia reflecting the amount of milk passing through the main passageway as represented by the sample collected in said cup, means for maintaining a constant pressure differential on opposite sides of said orifice and including an inverted cup detachably secured to said housing to provide in combination with the housing an accumulator chamber, the upper portion of said integrally formed tube projecting into said accumulator chamber to a point spaced substantially above the lower end thereof providing a passageway thereto and a connecting passageway extending through said housing from the lower end of said accumulator to said main passageway so that liquid may surge into said accumulator chamber and maintain the desired pressure balance, a check valve disposed adjacent to and downstream of said tube and arranged to prevent reverse flow of the milk stream therepast, said check valve comprising a seat formed on said housing and a spherical valve element engageable therewith, a plunger connected to said valve element for movement therewith, said valve seat and said orifice being aligned, said plunger extending through the downstream wall of said tube and sealingly engaging said orifice when said check valve is closed whereby when said check valve is open said plunger is displaced to permit flow of milk through said orifice and means for venting the upper end of said collection cup to atmosphere whereby suction applied to said main passageway will draw the sample upwardly to said tube and through said pressure balance means and back to said main passageway, said venting means comprising a passageway through said housing leading to said collection cup, a cantilever finger integrally molded with said housing and overlying said venting passageway, a sealing pad mounted on said finger whereby the finger may be manually flexed to displace the pad from said venting passageway to empty the collection cup.

15. A milk scale or other device for obtaining a proportionate sample from a flowing liquid stream and comprising a housing having a main passageway for the flow of the liquid stream therethrough, a tube intersecting said main passageway so that the liquid stream may flow therearound and a collection cup disposed below said main passageway, the lower end of said tube extending into said collection point and terminating at a point spaced from and closely adjacent thereto and providing a passageway leading to said collection cup, said tube having an orifice in its upstream wall for the passage of a sample liquid from the main passageway to the collection cup so that a sample will be collected therein as liquid flows through the main passageway, means for maintaining a constant pressure differential on opposite sides of said orifice and including a passageway extending through the upper end of said tube back to said main passageway and means for venting the upper end of said collection cup to atmosphere whereby suction applied through said main passageway will draw the sample from said collection cup upwardly through said tube and through said pressure balancing means back to said main passageway.

16. A milk scale or other device for obtaining a proportionate sample from a flowing liquid stream comprising a main passageway for the liquid stream, a cup, means for diverting a small proportionate sample of liquid from said main passageway to said cup, said diverting means comprising a small orifice through which the sample passes, means for maintaining a constant pressure differential on opposite sides of said orifice and including a passageway leading from the inner side of said orifice back to said main passageway, said balancing passageway being connected to passageway means terminating at a point adjacent the lower end of said cup, and means for venting the upper end of said collection cup to atmosphere whereby the sample therein will be returned to the main passageway through said pressure balancing means as suction is applied through said main passageway.

17. A milk scale or other device for obtaining a proportionate sample from a flowing liquid stream and comprising a main passageway for the liquid stream, a cup, means for diverting a small proportionate sample of liquid from said main passageway to said cup, a passageway leading from the lower end of said cup to a point spaced above said main passageway and then back to said main passageway, means for venting the upper end of said cup to atmosphere whereby the liquid in said cup will be drawn through the last-named passageway as a result of suction applied to said main passageway.

18. A milk scale or other device for obtaining a proportionate sample of liquid from a flowing liquid stream and comprising a housing having an upwardly angled main passageway for flow of the liquid stream therethrough, a tube integrally molded with said main housing and intersecting said main passageway so that the liquid stream may flow therearound, a collection cup disposed below said main passageway, the lower portion of said integrally formed tube extending into said cup, terminating at a point spaced from and adjacent to the lower end of said cup and providing a passageway thereto, said tube having an orifice in its upstream wall for the passage of a sample of liquid from the main passageway to the collection cup so that a sample will be collected therein as liquid flows through the main passageway and means for maintaining a constant pressure differential on opposite sides of said orifice and including an accumulator chamber, the upper portion of said integrally formed tube projecting into said accumulator chamber to a point spaced substantially above the lower end thereof and a passageway extending through said housing and connecting the lower end of said accumulator chamber and said main passageway, said connecting passageway being angled towards the upstream end of said main passageway so that liquid may surge into the accumulator chamber in maintaining the desired pressure balance, said collection cup having a port in its lower end offset from the tube extending therein, a closure having a plug portion inserted into said port and sealing same while a sample is being taken, the upstream end of said main passageway being defined by a tubular portion of said main housing, said closure further comprising an integral skirt having internal venting ribs, whereby the closure may be removed from said port and connected to a source of wash water and the skirt portion of said closure telescoped over the upstream end portion of said housing, the fit therebetween being such to hold the closure in place providing a liquid seal thereat which is vented to atmosphere, said plug portion being spaced from said main passageway whereby wash water drawn into said cup and through said pressure balancing means by suction applied at the downstream end of said main passageway will effectively wash all internal surfaces of said milk scale.

19. A milk scale or other device for obtaining a proportionate sample of liquid from a flowing liquid stream and comprising a housing having an upwardly angled main passageway for flow of the liquid stream therethrough, a tube integrally molded with said main housing and intersecting said main passageway so that the liquid stream may flow therearound, a collection cup disposed below said main passageway, the lower portion of said integrally formed tube extending into said cup, terminating at a point spaced from and adjacent to the lower end of said cup and providing a passageway thereto, said tube having an orifice in its upstream wall for the passage of a sample of liquid from the main passageway to the collection cup so that a sample will be collected therein as liquid flows through the main passageway and means for maintaining a constant pressure differential on opposite sides of said orifice and including an accumulator chamber, the upper portion of said integrally formed tube projecting into said accumulator chamber to a point spaced substantially above the lower end thereof and a passageway extending through said housing and connecting the lower end of said accumulator chamber and said main passageway, said connecting passageway being angled towards the upstream end of said main passageway so that liquid may surge into the accumulator chamber in maintaining the desired pressure balance, said collection cup having a port in its lower end offset from the tube extending therein, means for sealing said port while the sample is being taken, said sealing means being removable after the sample is taken for connection of the port to a source of wash water, and means for ventingly sealing the upstream end of said main passageway whereby wash water drawn into said cup and through said pressure balancing means by suction applied to the downstream end of said main passageway will effectively wash all internal surfaces of the milk scale.

20. A milk scale or other device for obtaining a proportionate sample of liquid from a flowing liquid stream and comprising a housing having an upwardly angled main passageway for flow of the liquid stream therethrough, a tube integrally molded with said main housing and intersecting said main passageway so that the liquid stream may flow therearound, a collection cup disposed below said main passageway, the lower portion of said integrally formed tube extending into said cup, terminating at a point spaced from and adjacent to the lower end of said cup and providing a passageway thereto, said tube having an orifice in its upstream wall for the passage of a sample of liquid from the main passageway to the collection cup so that a sample will be collected therein as liquid flows through the main passageway, means for maintaining a constant pressure differential on opposite sides of said orifice and including a passageway through said tube to said main passageway, said pressure balancing passageway extending into said main passageway at an angle towards the upstream end of the main passageway, said collection cup having a port in its lower end, means for sealing said port while the sample is being taken, said sealing means being removable after the sample is taken for connection of the port to a source of wash water and means for temporarily sealing the upstream end of said main passageway whereby wash water drawn into said cup and through said pressure balancing means by suction applied to the downstream end of said main passageway will effectively wash the internal surfaces of the milk scale.

21. In combination with a milk collection system, comprising a downwardly angled suction conduit, a milk scale for obtaining a proportionate sample of milk flowing from a milking machine to said suction conduit, said scale comprising a housing having a main passageway therethrough and connected at one end to the milking machine and having a resilient member defining the opposite end of said passageway which is telescoped over said suction conduit and expanded to provide the sole means for mounting said milk scale on said suction conduit, said scale further comprising a detachable, vertically disposed cup beneath said main passageway, a vertically disposed tube crossing said main passageway and extending to said cup, an orifice formed in the upstream wall of said tube through which a sample of milk may pass and flow into said cup, a check valve disposed adjacent to and downstream of said tube for preventing reverse flow of milk through said main passageway, a closed accumulator chamber disposed above said main passageway and into which the tube extends terminating at a point spaced above the lower portion of said accumulator chamber, a connecting passageway extending from said main passageway to said accumulator chamber, said connecting passageway, said accumulator chamber and the upper end of said tube providing passageway means for establishing a constant pressure differential on opposite sides of said orifice in the form of a pressure balance and permitting liquid to be withdrawn into said accumulator chamber to maintain said pressure balance without permitting liquid to flow therefrom into said cup.

22. In combination with a milk collection system comprising a downwardly angled suction conduit, a milk scale for obtaining a proportionate sample of milk flowing from a milking machine to said suction conduit, said scale comprising a housing having a main passageway therethrough and connected at one end to the milking machine and having a resilient member defining the opposite end of said passageway which is telescoped over said suction conduit and expanded to provide the sole means for mounting the milk scale on said suction conduit, said scale further comprising a detachable, vertically disposed cup beneath said main passageway, means for diverting a small proportionate sample of milk from said main passageway to said cup and a check valve disposed adjacent to and downstream of the milk flow past said diverting means and arranged to prevent reverse flow of the milk so that milk will flow past said diverting means only once.

References Cited by the Examiner

UNITED STATES PATENTS

| | | | |
|---|---|---|---|
| 1,649,241 | 11/1927 | Lewis | 73—422 |
| 1,790,968 | 2/1931 | Baulino. | |
| 1,964,775 | 7/1934 | Stuart | 73—421 X |
| 2,112,290 | 3/1938 | Holland | 285—239 X |
| 2,159,892 | 5/1939 | Hanks | 73—276 X |
| 2,322,018 | 6/1943 | Huber | 73—422 |
| 3,013,431 | 12/1961 | Splettstosser | 73—202 |
| 3,019,646 | 2/1962 | Gavin | 73—201 |
| 3,203,239 | 8/1965 | Yandell | 73—202 |

LOUIS R. PRINCE, *Primary Examiner.*

S. C. SWISHER, *Assistant Examiner.*